Patented Jan. 23, 1934

1,944,616

UNITED STATES PATENT OFFICE 1,944,616

PROCESS FOR MAKING CAST COMPACT CERAMIC PRODUCTS

Vladimir Škola, Aussig-on-the-Elbe, Czechoslovakia, assignor, by mesne assignments, to Corning Glass Works, Corning, N. Y., a corporation of New York No Drawing. Application April 25, 1932, Serial No. 607,505, and in Czechoslovakia April 29, 1931

1 Claim. (Cl. 49—79)

In the manufacture of cast ceramic articles from melts of refractory raw materials the impurities, as well as the presence of small quantities of gases, in such melts make themselves detrimentally apparent. The impurities in the melts, more particularly iron, adversely influence the homogeneity and consequently the excellence of the cast articles, whilst the gases present in the melts give rise to the formation of bubbles, etc. In addition the melting process as a rule does not lead forthwith to perfect melts owing to the non-uniform-quality of the raw materials. Generally speaking small solid portions of the raw materials are found in suspension in these melts, and these have an unfavourable influence on the texture of the cast products. Any impairing of the texture of these masses is extremely detrimental during the severe strain to which the cast refractory products made of bauxite, clay, etc., are exposed in the glass or cement industries and the like, and considerably diminish the life of the said masses. A material which still contains the foreign substances may, when used in glass furnaces, cause injurious contamination of the glass masses being prepared.

It has been found that a substantial improvement in the quality of cast ceramic products is produced very simply if the melts of the refractory raw materials are, prior to casting, maintained in the liquid state until the specifically heavier or lighter impurities have separated out from the melt proper and at the same time a degasification of the melt has taken place. One portion of the impurities passes as a specifically light layer to the surface of the melt, and protects the latter at the same time from solidification. Generally speaking a comparatively short time is sufficient to produce considerable purification and degasification of the melts.

The purification process may be carried out either in the melting furnace itself or in a separate heated intermediate vessel from which the casting is effected after the separation has taken place. The casting itself is carried out in the usual manner without utilization of the topmost and lowermost layers which are enriched with impurities.

Example

Bauxite containing 65% of aluminium oxide and about 2% of ferric oxide is fused in the electric furnace in the known manner. The melt is tapped off from the furnace into a thermally insulated casting vessel which is capable of being tipped over, and as thick a layer as possible of this melt is maintained in a state of rest in the vessel for a period of ten minutes. At the end of this time a considerable degasification and purification of the melt has already taken place with layer formation. The casting is carried out in such a way that the layer of slag floating about on the top is removed and about only nine-tenths of the depth of the melt is cast into the moulds, the lowermost layer, comprising about one-tenth of the depth, not being employed for making the cast articles. This waste material, after grinding, may be used as a valuable base material for the production of other refractory articles.

The time occupied in separating the impurities and the gases from the melt may be varied, according to the composition of the raw material, as well as according to the purity which is to be produced. If importance is attached to a high degree of purity, then the separation process is preferably carried out in the lower part of the melting furnace itself which accordingly is constructed to utilize the heat of this furnace for the maintenance of the fused state. The separation into layers, the lower of which contains the greater part of the impurities of the raw material, is already so far advanced after a short time that the products made in this way conform to the high requirements which are imposed. In order to promote the degasification the separation in the melt may be carried out under diminished air pressure. "Highly aluminous materials" as used in the claim has reference to materials containing 65% or more of aluminum oxide.

What I claim is:

In the casting of refractory articles from a melt of highly aluminous materials, the steps of maintaining the melt in a liquid state while the metallic impurities settle to the bottom and imperfectly melted particles rise to the top, and then casting the articles from the intermediate layer of the melt.

VLADIMIR ŠKOLA.